(12) United States Patent
Chen et al.

(10) Patent No.: US 11,324,018 B2
(45) Date of Patent: May 3, 2022

(54) TERMINAL AND A BASE STATION

(71) Applicant: NTT DOCOMO, INC., Tokyo (JP)

(72) Inventors: Lan Chen, Beijing (CN); Jing Wang, Beijing (CN); Xin Wang, Beijing (CN); Anxin Li, Beijing (CN); Xiaolin Hou, Beijing (CN); Liling Cai, Bejing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/875,130

(22) Filed: May 15, 2020

(65) Prior Publication Data

US 2020/0367264 A1   Nov. 19, 2020

(30) Foreign Application Priority Data

May 17, 2019   (CN) .......................... 201910413606.0

(51) Int. Cl.
*H04W 72/04* (2009.01)
*H04W 72/12* (2009.01)

(52) U.S. Cl.
CPC ... *H04W 72/1205* (2013.01); *H04W 72/1289* (2013.01)

(58) Field of Classification Search
CPC ........... H04W 72/048; H04W 72/1205; H04W 72/1289; H04W 74/0833; H04W 72/12
USPC ........................................................ 370/329
See application file for complete search history.

(56) References Cited

U.S. PATENT DOCUMENTS

| | | | |
|---|---|---|---|
| 2009/0003282 A1* | 1/2009 | Meylan | H04L 47/36 370/331 |
| 2013/0039202 A1* | 2/2013 | Feuersanger | H04L 5/001 370/252 |
| 2013/0201941 A1* | 8/2013 | Glasson | H04L 5/0012 370/329 |
| 2013/0301560 A1* | 11/2013 | Geirhofer | H04B 7/0417 370/329 |
| 2013/0315081 A1* | 11/2013 | Kim | H04W 72/042 370/252 |
| 2014/0219189 A1* | 8/2014 | Gore | H04B 7/0456 370/329 |
| 2014/0313908 A1* | 10/2014 | da Silva | H04W 72/042 370/252 |
| 2015/0110020 A1* | 4/2015 | Li | H04B 7/0619 370/329 |
| 2016/0037379 A1* | 2/2016 | Shafiee | H04W 28/0268 370/230.1 |
| 2016/0065344 A1* | 3/2016 | Lee | H04B 7/0456 370/329 |
| 2016/0099791 A1* | 4/2016 | Cui | H04W 72/1278 370/329 |
| 2016/0150467 A1* | 5/2016 | Shaw | H04W 12/062 370/329 |
| 2017/0230137 A1* | 8/2017 | Tang | H04W 72/1231 |
| 2017/0251488 A1* | 8/2017 | Urban | H04W 72/1263 |
| 2017/0290034 A1* | 10/2017 | Desai | H04W 4/027 |
| 2017/0332330 A1* | 11/2017 | Dhandu | H04W 4/70 |

(Continued)

*Primary Examiner* — Nathan S Taylor
(74) *Attorney, Agent, or Firm* — Osha Bergman Watanabe & Burton LLP (57) ABSTRACT

This disclosure provides a terminal and a base station. The base station includes: a processing unit configured to determine scheduling information for a first terminal according to historical information of the first terminal; and a transmitting unit configured to transmit the determined scheduling information to the first terminal.

9 Claims, 4 Drawing Sheets

500

Determining scheduling information for a first terminal according to historical information of the first terminal — S510

Transmitting the determined scheduling information to the first terminal — S520

(56) References Cited

U.S. PATENT DOCUMENTS

| | | | | |
|---|---|---|---|---|
| 2018/0270033 A1* | 9/2018 | Dou | ................... | H04W 72/0413 |
| 2018/0359789 A1* | 12/2018 | Yang | ..................... | H04W 76/28 |
| 2019/0349124 A1* | 11/2019 | Tang | ..................... | H04L 5/0082 |
| 2020/0296739 A1* | 9/2020 | Monajemi | ......... | H04W 72/1247 |

* cited by examiner

TERMINAL AND A BASE STATION

CROSS-REFERENCE TO RELATED APPLICATIONS

This application claims the benefit and priority of Chinese Application No. 201910413606.0, filed May 17, 2019. The entire disclosure of the above application is incorporated herein by reference.

TECHNICAL FIELD

The present disclosure relates to a field of wireless communication, and more particularly to a terminal and a base station in the field of wireless communication.

BACKGROUND

In a traditional wireless communication network, after a connection is established between a base station and a terminal through a random access process, the base station transmits configuration information regarding various configurations such as resource configuration, measurement configuration and feedback configuration, and reference signals to the terminal, such that the terminal performs measurement according to the configuration information and the reference signals, and feeds back, to the base station, measurement reports such as a cell indication, a beam indication, reference signal received power, Channel State Information (CSI) and the like. The base station determines a downlink transmission scheme or an uplink transmission scheme for the terminal based on the feedback of the terminal, that is, determines how to schedule the terminal. For example, the base station may determine, according to the feedback of the terminal, time and frequency resources allocated to the terminal, modulation and coding scheme level, the number of layers or streams transmitted to the terminal, a beamforming or precoding scheme, transmission antenna ports and the like. Then, the base station transmits these determined information about the downlink transmission scheme or the uplink transmission scheme of the terminal to the terminal, so that the terminal transmits according to instructions of the base station. This results in that extensive signaling regarding the reference signals, configurations and feedback need to be exchanged between the base station and the terminal before downlink transmission or uplink transmission by the base station and the terminal, and accordingly extensive physical resources are also occupied.

On the other hand, Artificial Intelligence (AI) technology has been used in many different fields with the development of science and technology. It is envisaged that in the near future, base stations or mobile stations with AI functions may also be proposed in wireless communication systems in order to provide services for users more efficiently.

SUMMARY

According to an aspect of the present disclosure, a base station is provided. The base station comprises: a processing unit configured to determine scheduling information for a first terminal according to historical information of the first terminal; and a transmitting unit configured to transmit the determined scheduling information to the first terminal.

According to an example of the present disclosure, the scheduling information may include at least one of time and frequency resources allocated to the terminal, modulation and coding scheme level, the number of layers or streams transmitted to the terminal, a beamforming or precoding scheme, and transmission antenna ports. In addition, in a case that a coordinated multipoint (CoMP) transmission technology is employed, the scheduling information may further include information about a CoMP scheme, such as at least one of transmission point selection information and precoding weight selection information.

According to an example of the present disclosure, in the above base station, the historical information includes at least one of position information, occurrence time information, and channel condition information of the first terminal.

According to an example of the present disclosure, in the above base station, the processing unit is further configured to determine the historical information of the first terminal according to a signal transmitted by the first terminal during a random access process or previously received data information from the first terminal.

According to an example of the present disclosure, in the above base station, the transmitting unit is further configured to transmit a first signaling to the first terminal, wherein the first signaling indicates that a channel measurement reference signal is disabled or no channel measurement reference signal is configured.

According to an example of the present disclosure, in the above base station, the transmitting unit is further configured to transmit a second signaling, and the second signaling indicates at least one of the first terminal not to perform precoding feedback and the first terminal not to perform the channel information feedback other than the precoding feedback.

According to an example of the present disclosure, in the above base station, the transmitting unit is further configured to transmit a third signaling, wherein the third signaling indicates that a traditional codebook is disabled.

According to an example of the present disclosure, in the above base station, the processing unit determines the scheduling information for the first terminal according to the historical information by using an artificial intelligence module, such as an artificial neural network; the artificial neural network is trained by at least a second terminal.

According to an example of the present disclosure, the above base station further comprises a receiving unit configured to receive feedback information from the first terminal, wherein the processing unit is further configured to determine the scheduling information for the first terminal according to the historical information together with the feedback information.

According to another aspect of the present disclosure, a terminal is provided, comprising: a receiving unit configured to receive a first signaling from a base station; and a processing unit configured to determine whether a reference signal is available or configured according to the first signaling.

According to another aspect of the present disclosure, a terminal is provided, comprising: a receiving unit configured to receive a second signaling; and a processing unit configured to indicate, according to the second signaling, at least one of the terminal not to perform precoding feedback and the terminal not to perform channel information feedback other than the precoding feedback.

According to another aspect of the present disclosure, a terminal is provided, comprising: a receiving unit configured to receive a third signaling; and a processing unit configured to determine whether a codebook is available according to the third signaling.

According to another aspect of the present disclosure, a terminal is provided, comprising: a processing unit configured to determine scheduling information (for example, information about an uplink transmission scheme of the terminal) for a terminal according to historical information of the terminal; and a transmitting unit configured to transmit the determined scheduling information to a base station.

According to an example of the present disclosure, the scheduling information may include at least one of time and frequency resources allocated to the terminal, modulation and coding scheme level, the number of layers or streams transmitted to the terminal, a beamforming or precoding scheme, and transmission antenna ports. In addition, in a case that a coordinated multipoint (CoMP) transmission technology is employed, the scheduling information may further include information about a CoMP scheme, such as at least one of transmission point selection information and precoding weight selection information.

According to an example of the present disclosure, in the above terminal, the historical information includes at least one of position information, occurrence time information, and measurement results of a downlink signal of the terminal.

According to another aspect of the present disclosure, a method performed by a base station is provided, the method comprising: a step of determining scheduling information for a first terminal according to historical information of the first terminal; and a step of transmitting the determined scheduling information to the first terminal.

According to an example of the present disclosure, in the above method, the historical information includes at least one of location information, occurrence time information, and channel condition information of the first terminal.

According to an example of the present disclosure, in the above method, further comprising a step of determining the historical information of the first terminal according to a signal transmitted by the first terminal during a random access process or previously received data information from the first terminal.

According to an example of the present disclosure, in the above method, further comprising a step of transmitting a first signaling to the first terminal, wherein the first signaling indicates that a channel measurement reference signal is disabled or no channel measurement reference signal is configured.

According to an example of the present disclosure, in the above method, further comprising a step of transmitting a second signaling, wherein the second signaling indicates at least one of the first terminal not to perform precoding feedback and the first terminal not to perform channel information feedback other than the precoding feedback.

According to an example of the present disclosure, in the above method, further comprising a step of transmitting a third signaling, the third signaling indicating that a traditional codebook is disabled.

According to an example of the present disclosure, in the above method, the step of determining the scheduling information for the first terminal according to the historical information of the first terminal may be determining the scheduling information for the first terminal according to the historical information by using an artificial intelligence module, such as an artificial neural network; the artificial neural network is trained by at least a second terminal.

According to an example of the present disclosure, the above method further comprises a step of receiving feedback information from the first terminal, wherein the scheduling information for the first terminal is determined according to the historical information together with the feedback information.

According to another aspect of the present disclosure, a method performed by a terminal is provided, comprising: receiving a first signaling from a base station; and determining whether a reference signal is available or configured according to the first signaling.

According to another aspect of the present disclosure, a method performed by a terminal is provided, comprising: receiving a second signaling; and indicating, according to the second signaling, at least one of the terminal not to perform precoding feedback and the terminal not to perform channel information feedback other than the precoding feedback.

According to another aspect of the present disclosure, a method performed by a terminal is provided, comprising: receiving a third signaling; and determining whether a codebook is available according to the third signaling.

According to another aspect of the present disclosure, a method performed by a terminal is provided, comprising: a step of determining scheduling information for the terminal according to historical information of the terminal; and a step of transmitting the determined scheduling information to a base station.

According to an example of the present disclosure, in the above method, the historical information includes at least one of location information, occurrence time information, and previous measurement results of a downlink signal of the terminal.

BRIEF DESCRIPTION OF THE DRAWINGS

The foregoing and other objectives, features and advantages of the present disclosure will become more apparent from detailed description of embodiments of the present disclosure in conjunction with the accompanying drawings. The drawings are included to provide a further understanding of the embodiments of the present disclosure, constitute a part of this specification, and help to explain the present disclosure together with the embodiments of the present disclosure, but are not intended to act as a limitation of the present disclosure. In the drawings, like reference numerals usually indicate like components or steps.

DETAILED DESCRIPTION

In order to make objectives, technical solutions and advantages of the present disclosure more apparent, exemplary embodiments according to the present disclosure will be described in detail below with reference to the drawings. Like reference numerals refer to like elements throughout the accompanying drawings. It should be understood that the embodiments described herein are merely illustrative and should not be construed as limiting the scope of the present disclosure. In addition, the terminal described herein may include various types of terminals, for example, a user equipment (UE), a mobile terminal (or referred to as a mobile station) or a fixed terminal. However, for convenience, the terminal and the UE sometimes may be used interchangeably hereinafter. As another example, an artificial neural network is a network used in an AI functional module in the embodiments of the present disclosure. For brevity, it is sometimes referred to as a neural network in the following description.

First, a wireless communication system in which the embodiments of the present disclosure may be applied will be described with referenced to FIG. 1. The wireless communication may be a 5G system, or may be any type of wireless communication systems such as an Long Term Evolution (LTE) system or an LTE-advanced (LTE-A) system.

Figure 1:
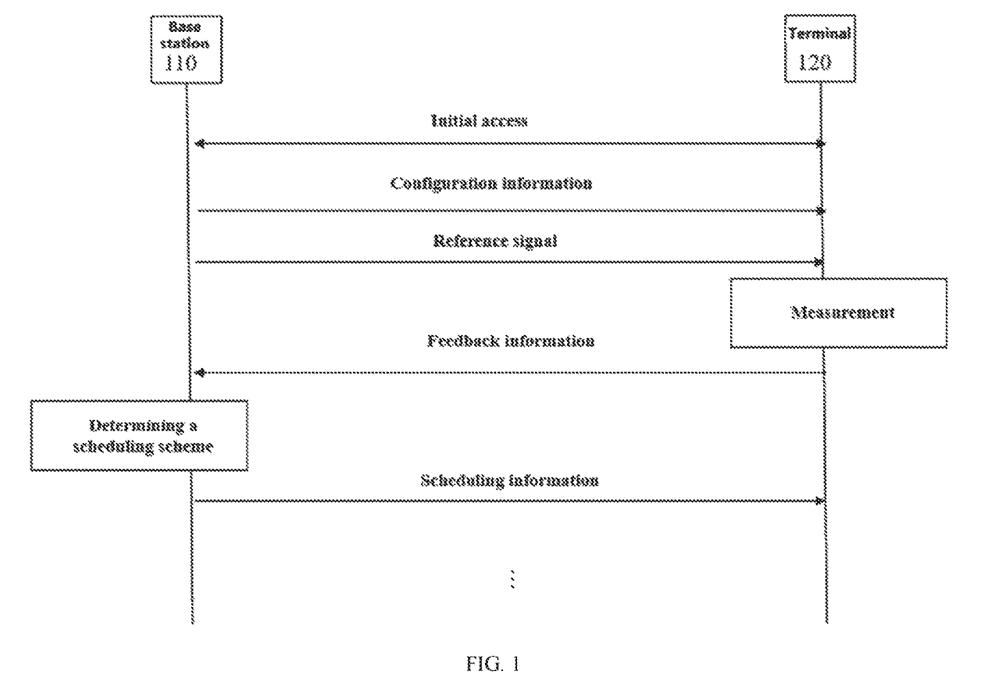
FIG. 1 is a schematic diagram of a wireless communication system in which embodiments of the present disclosure may be applied.

As shown in FIG. 1, after a terminal 120 enters a cell where a base station 110 is located, first, a connection is established between the base station and the terminal through a random access process. When the terminal 120 needs to perform downlink transmission or uplink transmission, the base station 120 transmits, to the terminal 110, configuration information regarding various configurations such as resource configuration, measurement configuration and feedback configuration, and a reference signal. The terminal 120 receives the reference signal transmitted by the base station and performs channel measurement according to the configuration information, and also feeds back measurement results to the base station according to the configuration information. The base station 110 determines a downlink transmission scheme or an uplink transmission scheme for the terminal 120 based on the feedback from the terminal 120, and transmits scheduling information about the downlink transmission scheme or the uplink transmission scheme to the terminal 120. For example, the scheduling information determined by the base station 110 based on the feedback information may include determined time and frequency resources allocated to the terminal, modulation and coding scheme level, the number of layers or streams transmitted to the terminal, a beamforming or precoding scheme, transmission antenna ports, and the like. Then, the terminal 120 performs downlink transmission or uplink transmission according to the scheduling information from the base station 110. It can be seen from the example shown in FIG. 1 that, before the downlink transmission or uplink transmission by the base station 110 and the terminal 120, the base station 110 and the terminal 120 need to perform a series of operations such as transmitting the configuration information, transmitting the reference signal, channel measuring and feeding back measurement results, and extensive signaling about the reference signal, configurations and feedback need to be exchanged between the base station 110 and the terminal 120, which occupies extensive physical resources.

On the other hand, with the development of science and technology, Artificial Intelligence (AI) technology has been applied in various fields, such as image processing, semantic recognition and medical fields. It is envisaged that in the future, AI technology may also be applied in the field of wireless communication to provide wireless communication services for users more intelligently.

The present disclosure proposes a terminal and a base station. In the terminal and the base station according to the present disclosure, it is desired to utilize, for example, an AI function to determine an uplink or downlink transmission scheme for the terminal according to the terminal's historical information and the like, so that reducing signaling overhead becomes possible.

Figure 2:
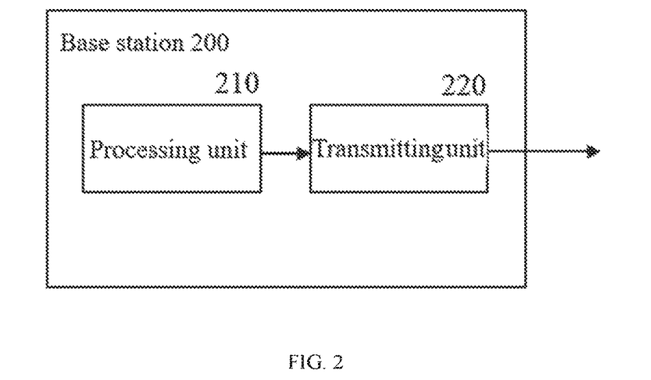
FIG. 2 is a schematic structural diagram of a base station according to an embodiment of the present disclosure.

A base station according to an embodiment of the present disclosure will be described below with reference to FIG. 2. FIG. 2 is a schematic structural diagram of a base station according to an embodiment of the present disclosure.

As shown in FIG. 2, the base station 200 includes a processing unit 210 and a transmitting unit 220. The processing unit 210 may determine scheduling information for a first terminal according to historical information of the first terminal. For example, the scheduling information may include time and frequency resources allocated to the first terminal, modulation and coding scheme level, the number of layers or streams transmitted to the terminal, a beamforming or precoding scheme, transmission antenna ports, and the like. In addition, in a case that Coordinated Multipoint (CoMP) transmission technology is employed, the scheduling information further includes transmission point selection information, precoding weight selection information, and the like.

With the rapid development of AI technology in recent years, neural networks have been widely used. According to an example of the present invention, the processing unit 210 may use a neural network to determine the scheduling information for the first terminal according to the historical information of the first terminal.

According to another example of the present invention, the neural network of the base station may be pre-trained using at least a second terminal. For example, the second terminal may be a terminal located in a cell in which a base station adjacent to the base station 200 or a base station co-located with the base station 200 is located. In particular, a base station adjacent to the base station 200 or a base station co-located with the base station 200 may provide the base station 200 with information about a terminal in a subordinate cell thereof.

As another example, the second terminal may be a training terminal dedicated to training the base station 200 after the base station 200 is deployed. In particular, the training terminal may report moving speed and direction, and measured downlink channel information to the base station via a dedicated channel while simulating an actual terminal to transmit signals.

Furthermore, the second terminal may also include the first terminal. For example, related information of the first terminal for which a scheduling scheme has been determined may be used as training data to train the neural network.

Furthermore, information about the second terminal may include at least one of location information, occurrence time information, and channel condition information of the second terminal, feedback information (such as a cell indication, a beam indication (SSB index, CSI-RS index), reference signal received power, CSI, etc.) corresponding to at least one of the occurrence time information and the channel condition information, and a downlink transmission scheme or an uplink transmission scheme (such as time and frequency resources allocated to the terminal, modulation and coding scheme level, the number of layers or streams transmitted to the terminal, a beamforming or precoding scheme, transmission antenna ports, etc.) corresponding to the feedback information. In addition, in a case that CoMP transmission technology is employed, the information about the second terminal further includes transmission point selection information, precoding weight selection information, and the like.

The base station 200 may use the above information about the second terminal as a training sequence to train its own neural network, to obtain a neural network with the historical information of the terminal as input and the downlink transmission scheme or uplink transmission scheme of the terminal as output, in which the historical information of the terminal may include, for example, at least one of location information, occurrence time information and channel condition information of the terminal. When the first terminal needs to be scheduled, the processing unit 210 may obtain the scheduling information for the first terminal by inputting the historical information of the first terminal to the trained neural network. For example, the historical information of the first terminal may be at least one of location information, occurrence time information and channel condition information of the first terminal. In other words, a type of the historical information of the first terminal may match a type of information required for an input of the neural network of the base station 200.

The processing unit 210 may obtain the scheduling information of the first terminal using one or more stages (i.e., no less than two stages) of neural network. For example, a one-stage neural network may have input as a channel condition and output as the scheduling information of the first terminal. In a case where the processing unit 210 obtains channel condition information of the first terminal according to received data information from the first terminal, the one-stage neural network may be used to obtain the scheduling information of the first terminal. As another example, in a case where the processing unit 210 has obtained time information or location information of the first terminal, one stage of network may be added on the basis of the above one-stage neural network, that is, a two-stage neural network is used to obtain the scheduling information of the first terminal. In particular, the processing unit 210 may first use the added neural network stage to determine the channel condition information of the first terminal according to the time information or the location information of the first terminal. The two-stage neural network (also referred to as a neural network including another sub-network) will be further described in conjunction with FIG. 3A.

In this embodiment, before the first terminal performs uplink transmission or downlink transmission, the base station 200 does not need to transmit configuration information or a reference signal to the first terminal, and the first terminal does not need to perform channel measurement or feed back measurement results, either. The base station 200, based on only the historical information of the first terminal, may determine the uplink transmission scheme or downlink transmission scheme for the first terminal, and obtain corresponding scheduling information, without requiring the terminal to provide feedback.

According to an example of the present disclosure, the processing unit 210 may determine the historical information of the first terminal according to a signal transmitted by the first terminal during a random access process. For example, the processing unit 210 may determine the location information of the first terminal according to an arrival angle of a signal such as a random access channel preamble (PRACH preamble), an Msg3 message, and the like transmitted by the first terminal received during the random access process. Furthermore, the location information of the first terminal may also be determined by joint positioning of multiple base stations. As another example, the processing unit 210 may determine the occurrence time information of the first terminal according to a time when the signal transmitted by the first terminal is received during the random access process. For another example, the processing unit 210 may determine the channel condition information of the first terminal according to signal quality and interference strength (i.e., uplink measurement results) of a signal transmitted by the first terminal received during the random access process. The channel condition information of the first terminal may include downlink channel condition information of the terminal and uplink channel condition information of the terminal. Furthermore, quality information of uplink and downlink channels may be used interchangeably when the channels have reciprocity (beam correspondence). Alternatively, the uplink and downlink channel condition information may be calibrated by using uplink and downlink channel characteristics.

According to another example of the present invention, the processing unit 210 may determine the historical information of the first terminal according to previously received data information from the first terminal. Similar to the signal transmitted by the first terminal during the random access process, for example, the processing unit 210 may determine the channel condition information of the first terminal according to signal quality and interference strength of the previously received data information from the first terminal.

Figure 3A:
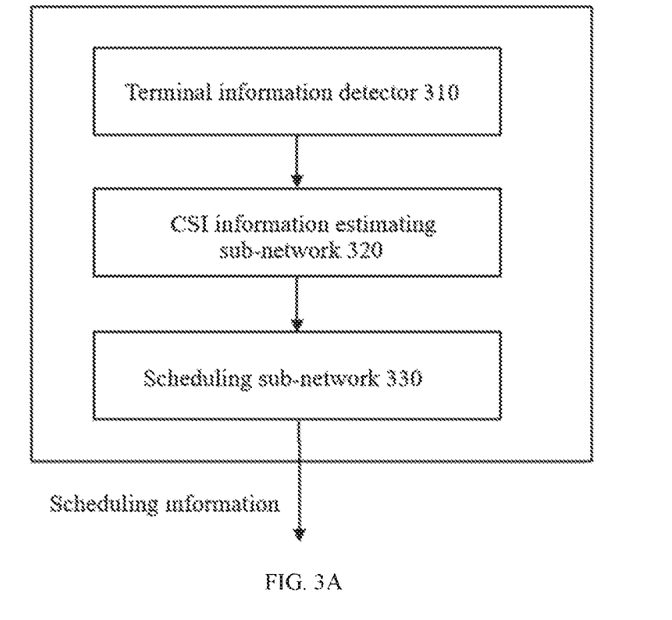
FIG. 3A is a schematic diagram illustrating determining scheduling information for a first terminal according to historical information of the first terminal by using a neural network according to an example of the present invention.

FIG. 3A is a schematic diagram illustrating determining the scheduling information for the first terminal according to the historical information of the first terminal by using a neural network according to an example of the present invention. In the example shown in FIG. 3A, determining the historical information of the first terminal based on a signal transmitted by the first terminal during a random access process is taken as an example for description. As should be understood, the signal transmitted by the first terminal during the random access process may also be replaced with the previously received data information from the first terminal, that is, uplink data information of the first terminal, and a neural network similar to FIG. 3A is employed to determine the scheduling information for the first terminal.

As shown in FIG. 3A, the processing unit of the base station may include a terminal information detector 310, and the neural network used by the processing unit 210 may include a CSI information estimating sub-network 320 and a scheduling sub-network 330. The terminal information detector 310 may use an existing random blind detection algorithm to determine a correspondence between, for example, a preamble, an Msg3 message, and the like received during the random access process and a terminal ID. The terminal information detector 310 may further determine the historical information of the terminal according to, for example, a preamble and an Msg3 message received during the random access process.

It should be noted that although in the example shown in FIG. 3A, the terminal information detector 310 being independent of the neural network and using an existing random blind detection algorithm is described as an example, but in an alternative example, it is possible to obtain the correspondence between the preamble, the Msg3 message, and the like received during the random access process and the terminal ID, and determine the historical information of the terminal by setting a sub-neural network.

The CSI information estimating sub-network 320 may be a sub-network pre-trained according to information such as at least one of location information and occurrence time information of the second terminal, and feedback information (such as a beam indication, RI, CQI, etc.) corresponding to the information described above. The processing unit 210 may input the historical information of the first terminal obtained by the terminal information detector 310 to the CSI information estimating sub-network 320, to estimate possible feedback information of the first terminal (for example, possible CSI feedback information of the first terminal, such as a beam indication, RI, CQI, etc.) with the CSI information estimation sub-network 320.

The scheduling sub-network 330 may be a sub-network pre-trained according to the feedback information of the second terminal and a downlink transmission scheme or an uplink transmission scheme corresponding to the feedback information. The processing unit 210 may input the possible feedback information of the first terminal estimated by the CSI information estimating sub-network 320 to the scheduling sub-network 330, to determine, with the scheduling sub-network 330, a downlink transmission scheme or an uplink transmission scheme for the first terminal, and correspondingly, the scheduling information for the first terminal, for example, time and frequency resources allocated to the first terminal, modulation and coding scheme level, and the like. In addition, the scheduling sub-network 330 may further determine the scheduling information of the first terminal based on a length of a data queue to be transmitted to the first terminal, a previous throughput of the first terminal, and the like.

Figure 3B:
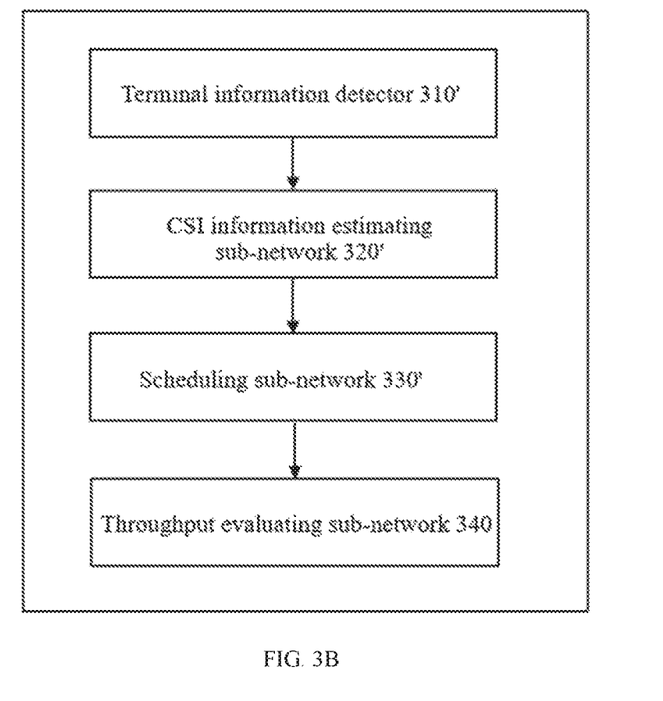
FIG. 3B is a schematic diagram illustrating determining scheduling information for a first terminal according to historical information of the first terminal by using a neural network according to another example of the present invention.

Furthermore, other sub-networks may be added after the scheduling sub-network 330 to further improve the throughput of the system. FIG. 3B is a schematic diagram illustrating determining the scheduling information for the first terminal according to the historical information of the first terminal by using a neural network according to another example of the present invention. In the example shown in FIG. 3B, the processing unit of the base station may include a terminal information detector 310', and the neural network used by the processing unit 210 may include a CSI information estimating sub-network 320', a scheduling sub-network 330' and a throughput evaluating sub-network 340. The terminal information detector 310', the CSI information estimating sub-network 320' and the scheduling sub-network 330' are similar to the terminal information detector 310, the CSI information estimating sub-network 320 and the scheduling sub-network 330, and will not be described herein for the sake of brevity. The throughput evaluating sub-network 340 may be pre-trained by using a throughput calculation function. The processing unit 210 may input the scheduling information determined by the scheduling sub-network 330 to the throughput evaluating sub-network 340. The throughput evaluating sub-network 340 may evaluate weighting and throughput of current scheduling results according to the scheduling information. In the example shown in FIG. 3B, the neural network of the base station 200 evaluates the throughput of the current scheduling results by the throughput evaluating sub-network 340, so that the neural network of the base station 200 may maximize the weighting and the throughput of the scheduling results.

Returning to FIG. 2, the transmitting unit 220 may transmit the scheduling information determined by the processing unit 210 to the first terminal. In addition, according to an example of the present invention, the transmitting unit 220 may transmit downlink data together with the scheduling information to the first terminal. According to another example of the present invention, the transmitting unit 220 may also transmit only the downlink data to the first terminal according to the determined scheduling scheme, and the terminal may perform full blind detection.

As described above, in this embodiment, based on only the historical information of the first terminal, the base station 200 may determine the uplink transmission scheme or the downlink transmission scheme for the first terminal, and obtain the corresponding scheduling information, without requiring the terminal to feed back. According to an example of the present invention, the base station 200 may notify the first terminal not to configure a reference signal for the first terminal, so that the first terminal may learn that measurement based on the reference signal is not required, and that measurement results are not required to be fed back. In particular, the transmitting unit 210 may further transmit a first signaling to the first terminal, where the first signaling indicates that a channel measurement reference signal is disabled or no channel measurement reference signal is configured. In addition, the transmitting unit 210 may further transmit a second signaling to the first terminal, where the second signaling indicates at least one of the first terminal does not perform precoding feedback and does not perform channel information feedback other than the precoding feedback. For example, as described below, in a case where a neural network is used for communication with the terminal, the base station 200 may transmit second signaling for not performing precoding feedback.

In addition, considering that there may be no data exchanged between the base station and the terminal for a long time, the historical information may not be able to accurately reflect a current situation of the terminal. According to an example of the present invention, at least one of the base station and the terminal may transmit dummy data to the other party to update the historical information if data is not exchanged between the two parties in a predetermined period of time. According to another example of the present invention, the RACH information may also be retransmitted between the terminal and the base station, in order for both parties to update the historical information.

In addition, according to another example of the present disclosure, in a case where a neural network is used for communication with the terminal, the base station 200 may not require a traditional codebook (such as a codebook in NR), or may use a codebook related to the neural network, for example, a codebook in which codewords contain parameters about the neural network. The transmitting unit 220 may further transmit a third signaling, where the third signaling indicates that a traditional codebook is disabled or indicates using a codebook related to the neural network.

Accordingly, according to an embodiment of the present disclosure, the terminal may include a receiving unit and a processing unit. The receiving unit may receive the first signaling from the base station, and the processing unit may determine whether a reference signal is available or configured according to the first signaling. According to another embodiment of the present disclosure, the receiving unit may further receive the second signaling, where the second signaling indicates at least one of the terminal does not perform precoding feedback and does not perform channel information feedback other than the precoding feedback. The processing unit may determine whether a corresponding feedback is required according to the second signaling. According to another embodiment of the present disclosure, the receiving unit further receives the third signaling, where the third signaling indicates that a codebook is disabled. The processing unit may determine not to use a codebook according to the third signaling. Furthermore, if the third signaling is received, the processing unit may determine not to perform precoding feedback.

In addition, although the above description is based on the example that the determination of base station 200 is only by the historical information of the first terminal without feedback from the terminal, according to another example of the present disclosure, the base station may also indicate the terminal to feed back a small amount of measurement results and take them as input of the neural network together with the historical information of the terminal, so as to reduce processing load of the processing unit 210 while saving signaling overhead. In particular, the base station 200 may further include a receiving unit to receive feedback information from the first terminal. And the processing unit 210 may determine the scheduling information for the first terminal according to the feedback information along with the historical information of the first terminal. For example, the neural network of the base station 200 may include multiple layers, and the processing unit 210 may use the feedback information as an input to a particular intermediate layer.

In the examples described in conjunction with FIG. 2 and FIGS. 3A-3B, the base station may determine the downlink scheduling scheme or the uplink scheduling scheme for the first terminal according to the historical information of the first terminal. According to another aspect of the present disclosure, the determination of the uplink scheduling scheme may also be performed by the terminal.

Figure 4:
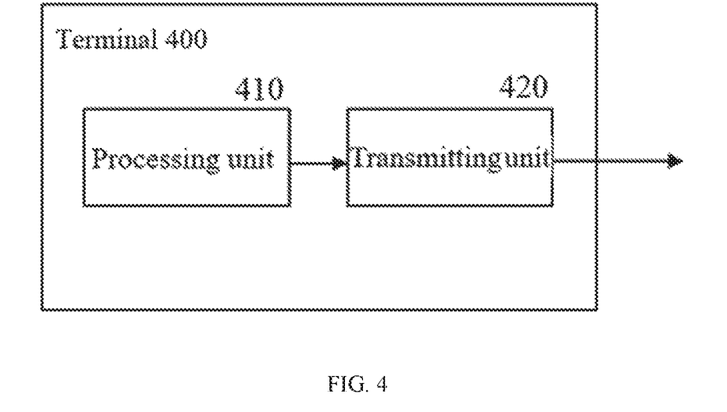
FIG. 4 is a schematic structural diagram of a terminal according to an embodiment of the present disclosure.

FIG. 4 is a schematic structural diagram of a terminal according to an embodiment of the present disclosure. As shown in FIG. 4, the terminal 400 includes a processing unit 410 and a transmitting unit 420. The processing unit 410 may determine scheduling information for the terminal 400 according to historical information of the terminal. Similar to the base station 200, according to an example of the present disclosure, the terminal 400 may also support a neural network. The processing unit 410 may take the historical information of the terminal 400 as an input of the neural network of the base station, and determine the scheduling information for the terminal 400 with the neural network. For example, the historical information may include at least one of location information, occurrence time information and previous measurement results of a downlink signal of the terminal 400. The specific examples of the processing unit 210 of the base station 200 using the neural network to determine the scheduling information for the first terminal have been described in detail above, and a process of determining the scheduling information for the terminal itself by using the neural network at the terminal side is similar to that at the base station side, which will not be described in detail herein.

The transmitting unit 420 may transmit the scheduling information determined by the processing unit 410 to the base station. According to another example of the present disclosure, the transmitting unit 420 may transmit uplink data to the base station together with the scheduling information. In addition, according to another example of the present invention, the transmitting unit 220 may also transmit only the uplink data to the base station according to the determined uplink scheduling scheme.

In addition, in a future communication system, there may be both a terminal that supports a neural network and a terminal that does not support a neural network, and each terminal has different support capabilities for the neural network. In order for a better corporation of the terminal and the base station, according to another example of the present disclosure, the terminal may first transmit information about its support capability for the neural network to the base station, and the base station may configure the neural network of the terminal according to the capability information transmitted by the terminal. For example, the base station may transmit, to the terminal, configuration information about the number of network layers, the number of nodes per layer, connection relationships of nodes, a network coefficient and an activation function of the neural network. Then, for the terminal having a specific neural network configuration, the base station performs operations such as indicating the terminal to perform feedback and indicating the terminal to determine a scheduling scheme by itself.

Figure 5:
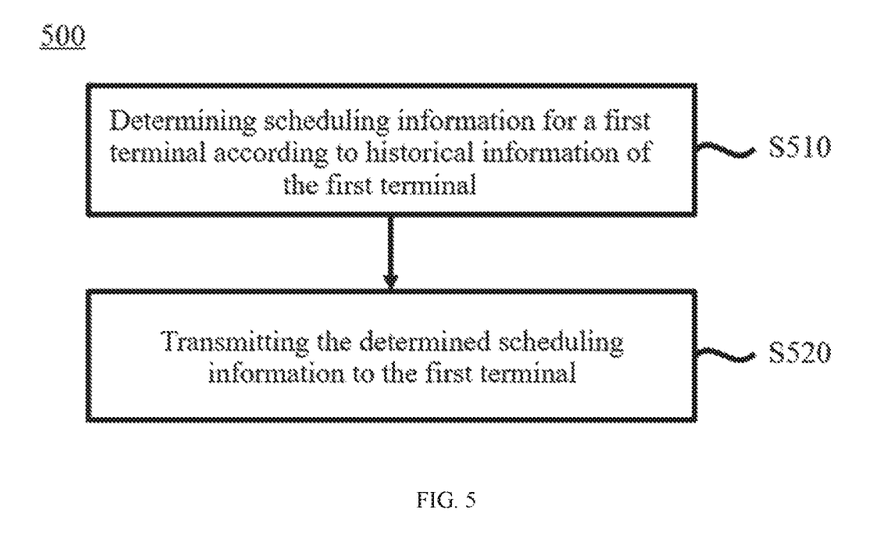
FIG. 5 is a flow chart of a method performed by a base station according to an embodiment of the present disclosure.

The base station according to an embodiment of the present disclosure has been described above with reference to FIG. 2. Next, a method performed by the base station will be described with reference to FIG. 5. FIG. 5 is a flow chart of a method performed by the base station according to an embodiment of the present disclosure.

As shown in FIG. 5, the method 500 includes steps S510 and S520. In step S510, scheduling information for a first terminal is determined according to historical information of the first terminal. According to an example of the present invention, the historical information of the first terminal is used as an input of the neural network of the base station performing the method 500, and in step S510, the scheduling information for the first terminal is determined with the neural network.

According to another example of the present invention, the neural network of the base station may be pre-trained by using at least a second terminal. The second terminal for training the neural network of the base station has been described above, which will not be described repeatedly herein.

In addition, information about the second terminal may include at least one of location information, occurrence time information and channel condition information of the second terminal, feedback information (such as a cell indication, a beam indication (SSB index, CSI-RS index), reference signal received power, CSI, etc.) corresponding to at least one of the occurrence time information and the channel condition information, and a downlink transmission schemes or an uplink transmission scheme (such as time and frequency resources allocated to the terminal, modulation and coding scheme level, the number of layers or streams transmitted to the terminal, a beamforming or precoding scheme, transmission antenna ports, etc.) corresponding to the feedback information.

The base station performing the method 500 may use the above information about the second terminal as a training sequence to train its own neural network, to obtain a neural network with the historical information of the terminal as input and the downlink transmission scheme or uplink transmission scheme of the terminal as output, in which the historical information of the terminal may include, for example, at least one of location information, occurrence time information and channel condition information of the terminal. When performing the method 500, in step S510, the scheduling information for the first terminal is determined with the trained neural network according to the historical information of the first terminal. For example, the historical information of the first terminal may be at least one of location information, occurrence time information and channel condition information of the first terminal. In other words, a type of the historical information of the first terminal may match a type of information required for an input of the neural network of the base station performing the base station 500.

In the method 500, the scheduling information of the first terminal may be obtained using one or more stages (i.e., no less than two stages) of neural network. For example, a one-stage neural network may have input as a channel condition and output as the scheduling information of the first terminal. In a case where channel condition information of the first terminal is obtained according to received data information from the first terminal, the one-stage neural network may be used to obtain the scheduling information of the first terminal. As another example, in a case where time information or location information of the first terminal is obtained, one stage of network may be added on the basis of the above one-stage neural network, that is, a two-stage neural network is used to obtain the scheduling information of the first terminal. In particular, the added neural network stage may be used firstly to determine the channel condition information of the first terminal according to the time information or the location information of the first terminal.

In this embodiment, before the first terminal performs uplink transmission or downlink transmission, the base station performing the method 500 does not need to transmit configuration information or reference signals to the first terminal, and the first terminal does not need to perform channel measurement or feed back measurement results, either. In step S510, based on only the historical information of the first terminal, the uplink transmission scheme or downlink transmission scheme for the first terminal may be determined and corresponding scheduling information may be obtained, without requiring the terminal to provide feedback.

According to an example of the present disclosure, in a case that the method 500 is applied, the historical information of the first terminal may be determined according to a signal transmitted by the first terminal during a random access process. For example, in the case that the method 500 is applied, the location information of the first terminal may be determined according to an arrival angle of a signal such as a random access channel preamble (PRACH preamble), an Msg3 message, and the like transmitted by the first terminal received during the random access process. Furthermore, the location information of the first terminal may also be determined by joint positioning of multiple base stations. As another example, in the case that the method 500 is applied, the occurrence time information of the first terminal may be determined according to a time when the signal transmitted by the first terminal is received during the random access process. For another example, in the case that the method 500 is applied, the channel condition information of the first terminal may be determined according to signal quality and interference strength (i.e., uplink measurement results) of a signal transmitted by the first terminal received during the random access process. The channel condition information of the first terminal may include downlink channel condition information of the terminal and uplink channel condition information of the terminal. Furthermore, quality information of uplink and downlink channels may be used interchangeably when the channels have reciprocity (beam correspondence). Alternatively, the uplink and downlink channel condition information may be calibrated by using uplink and downlink channel characteristics.

According to another example of the present invention, in the case that the method 500 is applied, the historical information of the first terminal may be determined according to previously received data information from the first terminal. In the case that the method 500 is applied, similar to the signal transmitted by the first terminal during the random access process, for example, the channel condition information of the first terminal may be determined according to signal quality and interference strength of the previously received data information from the first terminal.

Specific examples of determining the scheduling information for the first terminal according to the historical information of the first terminal by using the neural network in step S510 has been described above in conjunction with FIG. 3A, which will not be described repeatedly herein.

Next, in step S520, the scheduling information determined in step S510 is transmitted to the first terminal. In addition, according to an example of the present invention, in step S520, downlink data may be transmitted to the first terminal together with scheduling information.

As described above, in this embodiment, based on only the historical information of the first terminal, the base station performing the method 500 may determine the uplink transmission scheme or the downlink transmission scheme for the first terminal, and obtain the corresponding scheduling information, without requiring the terminal to feed back. According to an example of the present invention, in the case that the method 500 is performed, the first terminal is notified not to configure a reference signal for the first terminal, so that the first terminal may learn that measurement based on the reference signal is not required, and that measurement results are not required to be fed back. In particular, in the case that the method 500 is performed, a first signaling may be further transmitted to the first terminal, where the first signaling indicates that a channel measurement reference signal is disabled or no channel measurement reference signal is configured. In addition, in the case that the method 500 is performed, a second signaling may be further transmitted to the first terminal, where the second signaling indicates at least one of the first terminal does not perform precoding feedback and does not perform channel information feedback other than the precoding feedback. For example, as described below, in a case where a neural network is used for communication with the terminal, the base station 200 may transmit second signaling for not performing precoding feedback.

In addition, considering that there may be no data exchanged between the base station and the terminal for a long time, the historical information may not be able to accurately reflect a current situation of the terminal. According to an example of the present invention, at least one of the base station and the terminal may transmit dummy data to the other party to update the historical information if data is not exchanged between the two parties in a predetermined period of time. According to another example of the present invention, the RACH information may also be retransmitted between the terminal and the base station, in order for both parties to update the historical information.

According to another example of the present disclosure, in a case where a neural network is used for communication with the terminal, the base station performing the base station may not require a traditional codebook (such as a codebook in NR), or may use a codebook related to the neural network, for example, a codebook in which codewords contain parameters about the neural network. In the case that the method 500 is performed, a third signaling may be further transmitted, where the third signaling indicates that a traditional codebook is disabled or indicates using a codebook related to the neural network.

Accordingly, according to an embodiment of the present disclosure, a receiving method performed by the terminal may include receiving the first signaling from the base station, and whether a reference signal is available or configured may be determined according to the first signaling. According to another embodiment of the present disclosure, a receiving method performed by the terminal may further include receiving the second signaling, where the second signaling indicates at least one of the terminal does not perform precoding feedback and does not perform channel information feedback other than the precoding feedback. Whether a corresponding feedback is required may be determined according to the second signaling. According to another embodiment of the present disclosure, a receiving method performed by the terminal may further include receiving the third signaling, where the third signaling indicates that a codebook is disabled. It may be determined not to use a codebook according to the third signaling. Furthermore, if the third signaling is received, it may be determined not to perform precoding feedback.

In addition, according to another example of the present disclosure, in the case that the method 500 is performed, the base station may also indicate the terminal to feed back a small amount of measurement results and take them as input of the neural network together with the historical information of the terminal, so as to reduce processing load while saving signaling overhead. In particular, in the method 500, feedback information from the first terminal may also be received. At this time, in step S510, the scheduling information for the first terminal is determined according to the feedback information along with the historical information of the first terminal. For example, the neural network of the base station performing the method 500 may include multiple layers, and in step S510, the feedback information may be used as an input to a particular intermediate layer.

In the example described in conjunction with FIG. 5, in the method performed by the base station, the scheduling information for the first terminal is determined according to the historical information of the first terminal. According to another aspect of the present disclosure, these operations may also be contained in a method performed by the terminal.

Figure 6:
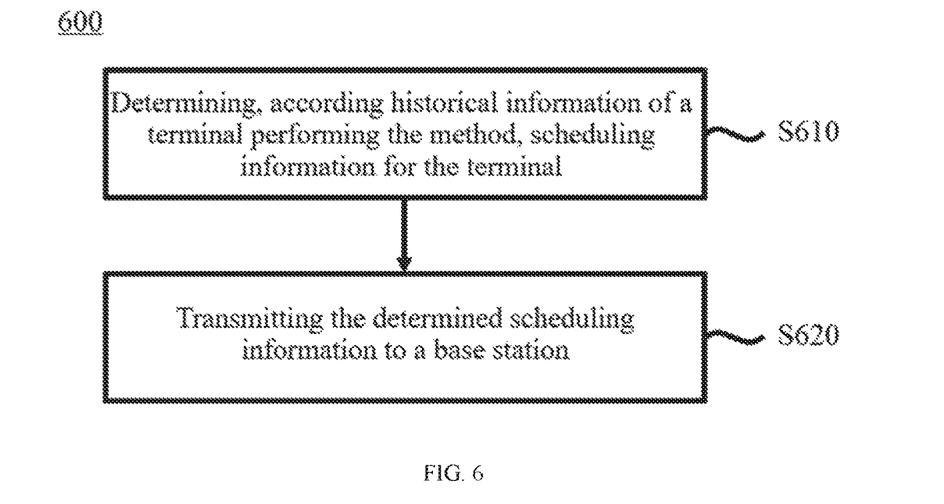
FIG. 6 is a flow chart of a method performed by a terminal according to an embodiment of the present disclosure.

FIG. 6 is a flow chart of a method performed by a terminal according to an embodiment of the present disclosure. As shown in FIG. 6, the method 600 includes a step S610 and a step S620. In step S610, scheduling information for the terminal performing the method 600 may be determined according to historical information of the terminal. Similar to the method 500, according to an example of the present disclosure, the terminal performing the method 600 may also support a neural network. In step S610, the historical information of the terminal performing the method 600 may be taken as an input of the neural network of the base station, and the scheduling information for the terminal is determined with the neural network. For example, the historical information may include at least one of location information, occurrence time information and previous measurement results of a downlink signal of the terminal performing the method 600. In step S610, a process of determining the scheduling information for the terminal itself that performs the method 600 by using the neural network is similar to that in the method 500, which will not be described in detail herein.

Next, in step S620, the scheduling information determined in step S610 is transmitted to the base station. In addition, according to another example of the present disclosure, in step S620, uplink data may be transmitted to the base station together with the scheduling information.

In addition, in a future communication system, there may be both a terminal that supports a neural network and a terminal that does not support a neural network, and each terminal has different support capabilities for the neural network. In order for a better corporation of the terminal and the base station, according to another example of the present disclosure, in a case that the method 600 is performed, information about support capability of the terminal performing the method 600 for the neural network may be transmitted to the base station firstly, and the base station may configure the neural network of the terminal according to the transmitted capability information. For example, the base station may transmit, to the terminal, configuration information about the number of network layers, the number of nodes per layer, connection relationships of nodes, a network coefficient and an activation function of the neural network. Then, for the terminal having a specific neural network configuration, the base station performs operations such as indicating the terminal to perform feedback and indicating the terminal to determine a scheduling scheme by itself <Hardware Structure>

In addition, block diagrams used in the description of the above embodiments illustrate blocks in units of functions. These functional blocks (structural units) are implemented in arbitrary combination of hardware and/or software. Also, the means for implementing each functional block is not particularly limited. That is, the respective functional blocks may be implemented by one apparatus that is physically and/or logically jointed; or more than two apparatuses that are physically and/or logically separated may be directly and/or indirectly (e.g., wiredly and/or wirelessly) connected, and the respective functional blocks may be implemented by these apparatuses.

Figure 7:
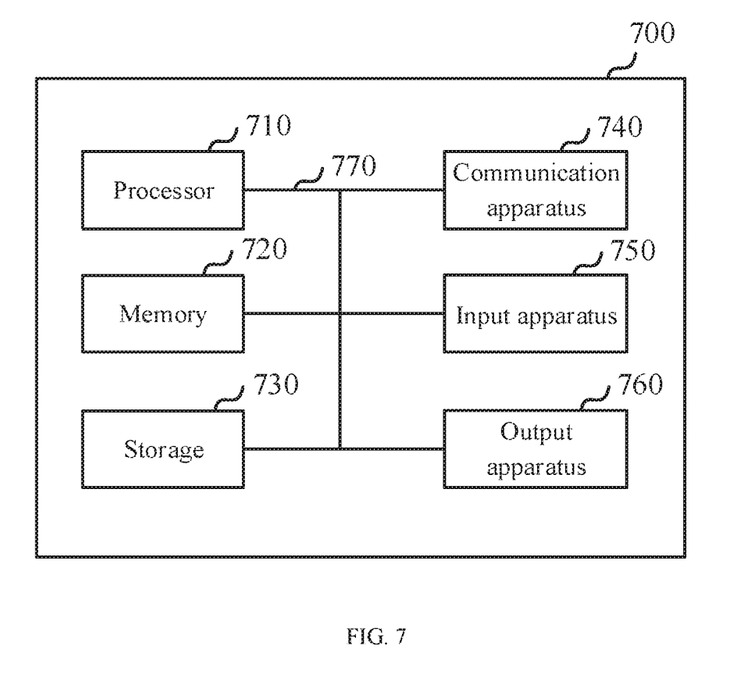
FIG. 7 is a schematic diagram of hardware structure of a device related according to an embodiment of the present disclosure.

For example, a device (such as, a first communication device, a second communication device, or a flying user terminal) according to an embodiment of the present disclosure may function as a computer that executes the processes of the wireless communication methods of the present disclosure. FIG. 7 is a schematic diagram of hardware structure of a device 700 (a base station or a user terminal) related according to an embodiment of the present disclosure. The above device 700 may be constituted as a computer apparatus that physically comprises a processor 710, a memory 720, a storage 730, a communication apparatus 740, an input apparatus 750, an output apparatus 760, a bus 770, etc.

In addition, in the following description, terms such as "apparatus" may be replaced with circuits, devices, units, and the like. The hardware structure of the user terminal and the base station may include one or more apparatuses shown in the figure, or may not include a part of the apparatuses.

For example, only one processor 710 is shown, but there may be multiple processors. In addition, the processing may be performed by one processor, or the processing may be performed by more than one processor simultaneously, sequentially, or by other methods. In addition, the processor 710 may be installed by more than one chip.

Respective functions of the device 700 may be implemented, for example, by reading specified software (program) on hardware such as the processor 710 and the memory 720, so that the processor 710 performs computations, controls communication performed by the communication apparatus 740, and controls reading and/or writing of data in the memory 720 and the storage 730.

The processor 710, for example, operates an operating system to control the entire computer. The processor 710 may be constituted by a central processing apparatus (CPU: Central Processing Unit), which includes interfaces with peripheral apparatuses, a control apparatus, a computing apparatus, a register, etc. For example, the processing unit, the transmitting unit and the like described above may be implemented by the processor 710.

In addition, the processor 710 reads programs (program codes), software modules and data from the storage 730 and/or the communication apparatus 740 to the memory 720, and execute various processing according to them. As a program, a program causing the computers to execute at least a part of the operations described in the above embodiments may be used. For example, the processing unit of the terminal or the base station described above may be implemented by a control program stored in the memory 720 and operated by the processor 710, and may also be implemented similarly for other functional blocks.

The memory 720 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 720 may also be referred to as a register, a cache, a main memory (a main storage apparatus), etc. The memory 720 may store executable programs (program code), software modules or the like for implementing the related methods of an embodiment of the present disclosure.

The storage 730 is a computer-readable recording medium, and may be constituted, for example, by at least one of a flexible disk, a floppy Disk®, a magneto-optical disk (such as, a Compact Disc ROM (CD-ROM), etc.), a digital versatile disk, a Blu-ray Disk®, a removable disk, a hard driver, a smart card, a flash memory device (e.g., a card, a stick and a key driver), a magnetic stripe, a database, a server, and other appropriate storage media. The storage 730 may also be referred to as an auxiliary storage apparatus.

The communication apparatus 740 is a hardware (transceiver device) performing communication between computers via a wired and/or wireless network, and is also referred to as a network device, a network controller, a network card, a communication module or the like, for example. The communication device 740 may include a high-frequency switch, a duplexer, a filter, a frequency synthesizer, etc. to implement, for example, Frequency Division Duplex (FDD) and/or Time Division Duplex (TDD). For example, the transmitting unit, the receiving unit, etc. described above may be implemented by the communication apparatus 740.

The input apparatus 750 is an input device (e.g., a keyboard, a mouse, a microphone, a switch, a button, a sensor, etc.) that receives input from the outside. The output apparatus 760 is an output device (e.g., a display, a speaker, a Light Emitting Diode (LED) light, etc.) that performs outputting to the outside. In addition, the input apparatus 750 and the output apparatus 760 may also be an integrated structure (e.g., a touch screen).

In addition, the respective apparatuses such as the processor 710 and the memory 720 are connected by the bus 770 that communicates information. The bus 770 may be constituted by a single bus or by different buses between the apparatuses.

In addition, the base station and the terminal may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 710 may be installed by at least one of these hardware.

(Variations)

In addition, the terms illustrated in the present specification and/or the terms required for the understanding of the present specification may be substituted with terms having the same or similar meaning. For example, a channel and/or a symbol may be a signal (signaling). In addition, the signal may be a message. A reference signal may be abbreviated as an "RS (Reference Signal)", and may be referred to as a "pilot", a "pilot signal" and so on, depending on the standard applied. In addition, a component carrier (CC) may also be referred to as a cell, a frequency carrier, a carrier frequency, or the like.

In addition, the information and parameters and the like described in this specification may be represented in absolute values or in relative values with respect to specified values, or may be represented in corresponding other information. For example, radio resources may be indicated by specified indices. Furthermore, equations using these parameters and the like may be different from those explicitly disclosed in this specification.

Names used for parameters and the like in this specification are not limitative in any respect. For example, since various channels (Physical Uplink Control Channel (PUCCH), Physical Downlink Control Channel (PDCCH), etc.) and information units may be identified by any suitable names, the various names assigned to these various channels and information units are not limitative in any respect.

The information, signals and the like described in this specification may be represented by using any one of various different technologies. For example, data, commands, instructions, information, signals, bits, symbols, chips, etc. all of which may be referenced throughout the above description, may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input and/or output via a plurality of network nodes.

The information, signals and the like that are input and/or output may be stored in a specific location (for example, in a memory), or may be managed in a control table. The information, signals and the like that are input and/or output may be overwritten, updated or appended. The information, signals and the like that are output may be deleted. The information, signals and the like that are input may be transmitted to other apparatuses.

Reporting of information is by no means limited to the aspects/embodiments described in this specification, and other methods may be used as well. For example, reporting of information may be implemented by using physical layer signaling (for example, Downlink Control Information (DCI), Uplink Control Information (UCI)), higher layer signaling (for example, Radio Resource Control (RRC) signaling, broadcast information (Master Information Blocks (MIBs), System Information Blocks (SIBs), etc.), Medium Access Control (MAC) signaling, etc.), other signals or combinations thereof.

In addition, physical layer signaling may also be referred to as L1/L2 (Layer 1/Layer 2) control information (L1/L2 control signals), L1 control information (L1 control signals) and the like. Also, RRC signaling may be referred to as an RRC message, for example, may be an RRC connection setup message, an RRC connection reconfiguration message, etc. Also, MAC signaling may be reported by using, for example, MAC control elements (MAC CEs).

In addition, notification of prescribed information (for example, a notification of "X") is not limited to being performed explicitly, and may be performed implicitly (for example, by not performing the notification of the prescribed information or by notifying other information).

Decision may be performed by a value (0 or 1) represented by 1 bit, or by a true or false value (boolean value) represented by TRUE or FALSE, or by a numerical comparison (e.g., comparison with a prescribed value).

The software described above can be broadly interpreted as commands, command sets, code, code segments, program code, programs, sub-programs, software modules, applications, software applications, software packages, routines, sub-routines, objects, executable files, execution threads, steps, functions, etc., irrelevant with being referred to as software, firmware, middleware, microcode, hardware description language or other names.

In addition, software, commands, information, etc. may be transmitted and received via a transport medium. For example, when the software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell, etc.

The base station is capable of accommodating one or more (for example, three) cells (also referred to as sectors). In a case where the base station accommodates a plurality of cells, an entire coverage area of the base station may be divided into a plurality of smaller areas, and each smaller area may provide communication services by using a base station sub-system (for example, a small base station for indoor use (a Remote Radio Head (RRH)). The terms "cell" and "sector" refer to a part of or an entirety of a coverage area of the base station and/or a sub-system of the base station that provides communication services in this coverage.

In this specification, terms such as "Mobile Station (MS) ", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

In addition, the wireless base station in this specification may be also replaced with a user terminal. For example, for a configuration in which communication between a wireless base station and a user terminal is replaced with communication between a plurality of user terminals (Device-to-Device, D2D), respective manners/embodiments of the present disclosure may be applied. At this time, functions of the first communication device or the second communication device in the device 700 described above may be regarded as functions provide by the user terminals. In addition, the words "up" and "down" may also be replaced with "side". For example, the uplink channel may be replaced with a side channel.

Also, the user terminal in this specification may be replaced with a wireless base station. At this time, the functions provided by the above user terminal may be regarded as functions provided by the first communication device or the second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, a Mobility Management Entity (MME), a Serving-Gateway (S-GW), etc., but not limited thereto may be considered)), or combinations thereof.

The respective manners/embodiments described in this specification may be used individually or in combinations, which may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders that are described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM® (Global System for Mobile communications), CDMA 3000, UMB (Ultra Mobile Broadband), IEEE 902.11 (Wi-Fi®), IEEE 902.16 (WiMAX®), IEEE 902.20, UWB (Ultra-Wide-Band), Bluetooth® and other appropriate radio communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to the first and second units does not imply that only two units may be employed, or that the first unit must precede the second unit in several ways.

The terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in the memory) etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, the terms such as "connected" and "coupled", or any variation thereof mean any direct or indirect connection or coupling between two or more units, and may include the presence of one or more intermediate units between two units that are "connected" or "coupled" to each other. The coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in radio frequency regions, microwave regions and/or optical (both visible and invisible) regions.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described herein. The present disclosure may be implemented with various modifications and alterations, without departing from the spirit and scope of the present disclosure defined by the recitations of the claims. Consequently, the description in this specification is for the purpose of illustration, and does not have any limitative meaning to the present disclosure.

What is claimed is:

1. A base station, comprising:
  a processing unit configured to determine scheduling information for a first terminal according to historical information of the first terminal; and
  a transmitting unit configured to transmit the determined scheduling information to the first terminal,
  wherein the historical information includes at least one of position information and occurrence time information, and
  wherein the transmitting unit is further configured to transmit a second signaling, and the second signaling indicates at least one of the first terminal not to perform precoding feedback and the first terminal not to perform the channel information feedback other than the precoding feedback.

2. The base station according to claim 1, wherein
  the processing unit is further configured to determine the historical information of the first terminal according to a signal transmitted by the first terminal during a random access process or previously received data information from the first terminal.

3. The base station according to claim 1, wherein
  the processing unit determines the scheduling information for the first terminal according to the historical information by using a neural network;
  the neural network is trained by at least a second terminal.

4. The base station according to claim 1, further comprising:
  a receiving unit configured to receive feedback information from the first terminal, wherein
  the processing unit is further configured to determine the scheduling information for the first terminal according to the historical information together with the feedback information.

5. The base station according to claim 1, wherein
  the scheduling information includes at least one of time and frequency resources allocated to the first terminal, modulation and coding scheme level, the number of layers or streams transmitted to the first terminal, a beamforming or precoding scheme and transmission antenna ports.

6. The base station according to claim 1, wherein
  the transmitting unit is further configured to transmit a first signaling to the first terminal, wherein the first signaling indicates that a channel measurement reference signal is disabled or no channel measurement reference signal is configured.

7. The base station according to claim 1, wherein
  the transmitting unit is further configured to transmit a third signaling, wherein the third signaling indicates that a traditional codebook is disabled.

8. A terminal, comprising:
  a processing unit configured to determine scheduling information for the terminal according to historical information of the terminal; and
  a transmitting unit configured to transmit the determined scheduling information to a base station,
  wherein the historical information includes at least one of location information and occurrence time information, and
  wherein the terminal further comprises a receiving unit configured to receive a second signaling, and the second signaling indicates at least one of the terminal not to perform precoding feedback and the terminal not to perform the channel information feedback other than the precoding feedback.

9. The terminal according to claim 8, wherein
  the scheduling information includes at least one of time and frequency resources allocated to the terminal, modulation and coding scheme level, the number of layers or streams transmitted to the terminal, a beamforming or precoding scheme and transmission antenna ports.

* * * * *